US011327895B1

(12) United States Patent
Vankamamidi et al.

(10) Patent No.: US 11,327,895 B1
(45) Date of Patent: May 10, 2022

(54) PROTOCOL FOR PROCESSING REQUESTS THAT ASSIGNS EACH REQUEST RECEIVED BY A NODE A SEQUENCE IDENTIFIER, STORES DATA WRITTEN BY THE REQUEST IN A CACHE PAGE BLOCK, STORES A DESCRIPTOR FOR THE REQUEST IN A CACHE PAGE DESCRIPTOR, AND RETURNS A COMPLETION ACKNOWLEDGEMENT OF THE REQUEST

(71) Applicant: EMC IP Holding Company LLC, Hopkinton, MA (US)

(72) Inventors: Vamsi K. Vankamamidi, Hopkinton, MA (US); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/191,755

(22) Filed: Mar. 4, 2021

(51) Int. Cl.
*G06F 12/0884* (2016.01)

(52) U.S. Cl.
CPC .. *G06F 12/0884* (2013.01); *G06F 2212/1024* (2013.01)

(58) Field of Classification Search
CPC ............... G06F 12/0884; G06F 2212/1024
USPC ............. 711/118, 154; 710/29; 709/237, 238
See application file for complete search history.

(56) References Cited

U.S. PATENT DOCUMENTS

| 9,135,123 | B1* | 9/2015 | Armangau | G06F 11/1471 |
| 10,685,014 | B1* | 6/2020 | Pleshachkov | G06F 16/2379 |
| 2009/0234987 | A1* | 9/2009 | Lee | G06F 9/5038 |
| | | | | 710/39 |
| 2021/0034247 | A1* | 2/2021 | Kucherov | G06F 3/0607 |
| 2021/0216213 | A1* | 7/2021 | Shveidel | G06F 3/0659 |

OTHER PUBLICATIONS

Vladimir Shveidel, et al., U.S. Appl. No. 16/916,330, filed Jun. 30, 2020, "System and Method for Parallel Journaling in a Storage Cluster".

* cited by examiner

*Primary Examiner* — Hong C Kim
(74) *Attorney, Agent, or Firm* — Muirhead and Saturnelli, LLC

(57) ABSTRACT

Processing requests may include: receiving a write request from a host at a first node of a system; and servicing the write comprising assigning, by the first node, a sequence identifier to the write request, wherein the sequence identifier is included in a subsequence of identifiers only assignable by the first node, performing in parallel a first operation that stores first data written by the write request in a cache, a second operation that stores a descriptor for the write request in the cache, and a third operation that sends the descriptor (including the sequence identifier) to a peer node of the system; determining by the first node that the first, second and third operations have successfully completed; and responsive to determining the first, second and third operations have successfully completed, sending an acknowledgement from the first node to a host indicating successful completion of the write request.

20 Claims, 8 Drawing Sheets

PROTOCOL FOR PROCESSING REQUESTS THAT ASSIGNS EACH REQUEST RECEIVED BY A NODE A SEQUENCE IDENTIFIER, STORES DATA WRITTEN BY THE REQUEST IN A CACHE PAGE BLOCK, STORES A DESCRIPTOR FOR THE REQUEST IN A CACHE PAGE DESCRIPTOR, AND RETURNS A COMPLETION ACKNOWLEDGEMENT OF THE REQUEST

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing requests comprising: receiving a first write request from a host at a first node of a data storage system, wherein the first write request writes first data to a first target location, wherein the data storage system includes the first node and a second node; and performing first processing to service the first write request, the first processing including: assigning, by the first node, a first sequence ID (identifier) to the first write request, wherein the first sequence ID is included in a first subsequence of a sequence of sequence IDs, wherein the first node is the only node of the data storage system that assigns sequence IDs of the first subsequence; performing in parallel a first operation that stores the first data in a first PB (page block) of a cache, a second operation that stores a first descriptor for the first write request in a first PDESC (page descriptor) of the cache, and a third operation that sends the first descriptor to the second node, wherein the first descriptor includes the first sequence ID; determining by the first node that the first operation, the second operation and the third operation have successfully completed; and responsive to determining by the first node that the first operation, the second operation and the third operation have successfully completed, sending an acknowledgement from the first node to the host indicating successful completion of the first write request.

In at least one embodiment, assigning, by the first node, the first sequence ID may further comprise: determining a first value that is a maximum of a second value and a third value stored locally on the first node, wherein the second value is a largest sequence ID assigned to a request received by the first node and the third value is a largest sequence ID received from the second node and denotes a largest sequence ID assigned to a request received by the second node, wherein the third value is received by the first node as part of processing performed by the second node for servicing a second write request received by the second node; and determining a first increment to add to the first value, wherein the first increment is an amount added to the second value to obtain the first sequence ID that is a next sequence ID in the first subsequence. The sequence may be monotonically increasing and the first subsequence may also be monotonically increasing. The first descriptor may include a reference or pointer to the first PB in the cache and the first descriptor may include the first target location written to by the first write request.

In at least one embodiment, the second node may receive the first descriptor sent by the first node and, in response to receiving the first descriptor, the second node may perform second processing comprising: updating a local copy of tracked sequence IDs to include the first sequence ID of the first descriptor as a fourth value that is the largest sequence ID that is received from the first node and that denotes the largest sequence ID assigned to a request received by the first node, wherein the local copy is used only by the second node, wherein the local copy also includes a fifth value denoting the largest sequence ID assigned to a request received by the second node; and returning an acknowledgement to the first node indicating receipt of the first descriptor by the second node. The second processing may include storing the first descriptor in a first location in a memory local to the second node, and wherein the second node may use the first descriptor to service a read request received by the second node, wherein the read request may read data stored at the first target location.

In at least one embodiment, servicing the read request by the second node may include: using the reference or pointer to the first PB to read the first data stored in the first PB of the cache; and returning the first data to a requester that sent the read operation to the second node. The cache may include a first PB tier, a first PDESC tier, a second PB tier, and a second PDESC tier. The first PDESC tier and the first PB tier may be managed solely by the first node. The second PB tier and the second PDESC tier may be managed solely by the second node. The first PB may be allocated by the first node from the first PB tier and the first PDESC may be allocated by the first node from the first PDESC tier.

In at least one embodiment, the second node may receive from the host the second write request that writes second data to a second target location. The second node may perform third processing for servicing the second write request and the third processing may include: allocating a second PB from the second PB tier; allocating a second PDESC from the second PDESC tier; assigning a second sequence ID to the second write request, wherein the second sequence ID is included in a second subsequence of the sequence of sequence IDs, wherein the second node is the only node of the data storage system that assigns sequence IDs of the second subsequence; performing in parallel a fourth operation that stores the second data in a second PB, a fifth operation that stores a second descriptor for the second write request in a the second PDESC, and a sixth operation that sends the second descriptor to the first node, wherein the second descriptor includes the second sequence ID, a pointer or reference to the second PB, and the second target location; determining by the second node that the fourth operation, the fifth operation and the sixth operation have successfully completed; and responsive to determining by the second node that the fourth operation, the fifth operation and the sixth operation have successfully completed, sending an acknowledgement from the second node to the host indicating successful completion of the second write request.

In at least one embodiment, assigning, by the second node, the second sequence ID may further comprise: determining a sixth value that is a maximum of the fourth value and the fifth value included in the local copy of tracked sequence IDs used only by the second node; and determining a second increment to add to the sixth value, wherein the second increment is an amount added to the sixth value to obtain the second sequence ID that is a next sequence ID in the second subsequence. The second subsequence may be monotonically increasing.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
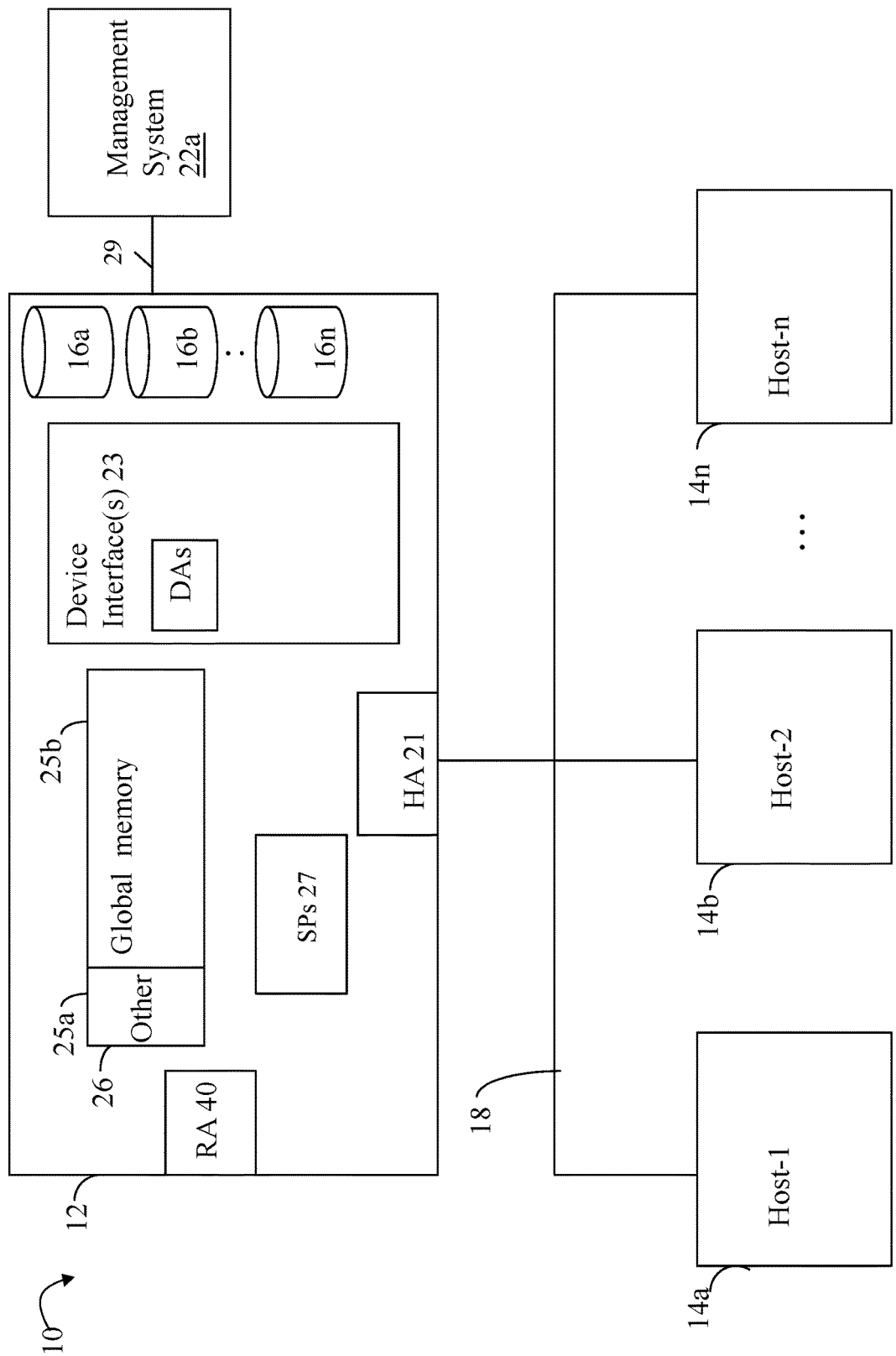
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
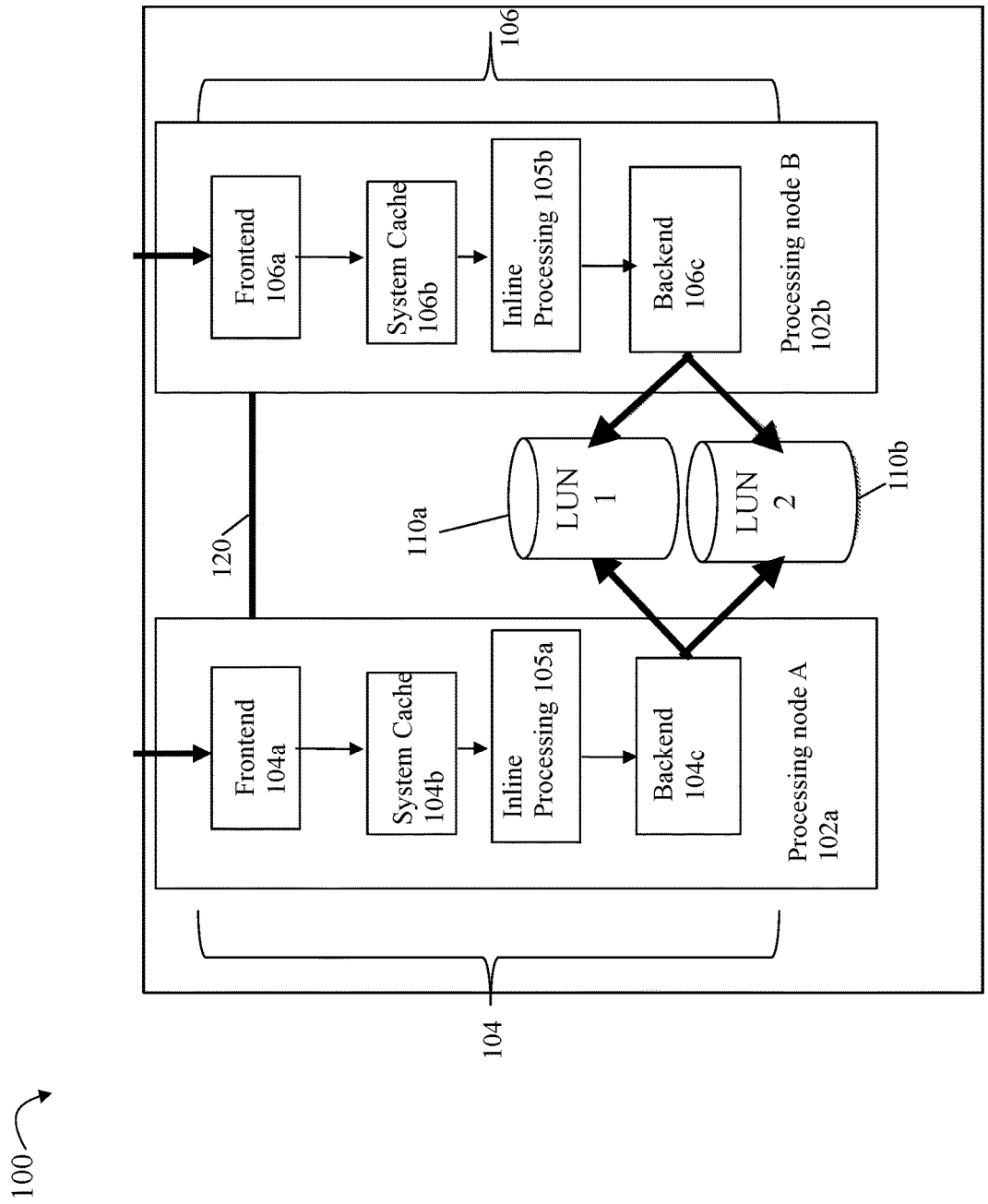
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data duplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Each node of the pair may include its own resources such as its own local (i.e., used only by the node) resources such as local processor(s), local memory, and the like.

Consistent with other discussion herein, a cache may be used for caching write I/O data and other cached information. The other cached information may include, for example, cached operations or commands such as create snapshot commands. In one system, the cache may be implemented using multiple caching devices or PDs, such as non-volatile (NV) SSDs such as NVRAM devices that are external with respect to both of the nodes or storage controllers. The caching devices or PDs used to implement the cache may be configured in a RAID group of any suitable RAID level for data protection. The caching PDs form a shared cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where cached data stored on the caching devices or PDs is eventually flushed to the BE PDs as discussed elsewhere herein.

In a data storage system, minimizing the latency of read and write I/O requests is a critical performance metric. In at least one data storage system using the dual node architecture such as described in connection with FIG. 2, for write operations, latency is determined by the amount of time taken to store the write data in the cache where the write data is visible to both nodes or controllers of the system.

Additionally, for purposes of data integrity and correctness, the time order dependency of the cached data and operations needs to be maintained. The time order is with respect to the relative order in which the operations are to be applied to the stored data of the data storage system to ensure data integrity and correctness. In an active-active system where I/Os may be serviced by both nodes of the dual node system, the time order dependency requirement needs to be maintained and synchronized across both nodes of the system. For example, at a first point in time, the node A may process a first write that is acknowledged to the host as completed. The first write may write first data to a first logical address, where the first data is stored in the cache and subsequently flushed to the BE PDs. At a second point in time subsequent to the first point in time, the node B may process a second write that is acknowledged to the host as completed. The second write may write second data to the first logical address where the second data is also stored in the cache and subsequently flushed to the BE PDs. When flushing the cached first data and the cached second data, the time order dependency or requirement is that the second data of the second write needs to be stored to the physical storage containing the data for the first logical address after the first data in order to ensure that the actual physical storage contains the correct data expected by the host based on the order in which the first and second writes were acknowledged to the host as being applied to the first logical address. Since the second write is acknowledged as successfully complete subsequent to the successful acknowledgement of the first write, the host expects the first logical address to contain the second data written (or overwritten) by the second subsequent write. In at least one system, the time order of cached data and operations may be denoted using global sequence numbers.

In one such dual node system not in accordance with the techniques herein, one of the two nodes is designated as the primary node which assigns each cached data item or operation a new unique sequence number. The sequence numbers of the cached data items or operations denote the time dependent order in which such cached data items or operations are logically applied to the stored data in order to maintain the data integrity and data content and expected by the host or other clients. The order in which the data is flushed from the cache maintains the time order requirement or dependency as denoted by the sequence numbers.

Thus, the designated primary node of the system node pair is designated as the primary node with respect to all write operations and other operations having cached data across all the LUNs configured from storage of the BE PDs accessible by the node pair. The primary node, for example, assigns a unique sequence number to each write I/O operation having its write data stored in the cache. The primary node assigns all the sequence numbers independent of which node receives the write I/O or other operation having corresponding cached data that is subsequently flushed from the cache. Thus, the primary node assigns sequence numbers for writes and other commands or operations that are cached, where such writes and other commands are received collectively by both the primary node and the non-primary node of the pair. The sequence numbers assigned establish the time order. In particular, the time order may be denoted by the increasing sequence numbers. To illustrate, assume a first sequence number is assigned to a first write I/O that writes first data, a second sequence number is assigned to a second write I/O that writes second data, and the first sequence number is less than the second sequence number. In this case, the first write I/O and first data is occurs in the time order sequence prior to the second write I/O and second data, where the first write I/O and the first data is written or applied prior to the second write I/O and the second data. In this manner, the sequence numbers assigned by the primary node are used to establish the time order of all the write I/Os written to all the LUNs configured from storage of the BE PDs where the pair of nodes services all I/Os directed to such LUNs.

In one dual node system, the cache may include page blocks (PBs) and page descriptors (PDESCs). Each write I/O that writes data to a target logical address may have its associated write data stored in the cache using a PB and a PDESC. The write data is stored in a PB and the PDESC references or points to the PB containing the write data. The PDESC may generally include other information regarding the write I/O such as, for example, the target logical address (e.g., LUN and LBA or offset). In one such dual node system, the designated primary node that assigns sequence numbers is also the sole node managing the page descriptors or PDESCs stored in the cache. Thus the primary node is the sole node of the pair that assigns sequence numbers of cached items or operations received by both nodes. The primary node also is the sole node that handles allocating PDESCs and freeing PDESCs on behalf of requests or operations received by both nodes. Thus, in an active-active configuration where both nodes of the pair may receive I/Os and other commands, all requests for new sequence numbers and new PDESC allocations for caching are done only by the primary node even though the received I/Os or other commands may be received by the peer non-primary node. The primary node may assign monotonically increasing sequence numbers to new requests. In such a system, each node receiving the I/O or other command requiring caching obtains an available PB from the cache. In such a system, the node A may have its own separate pool of PBs that is managed solely by the node A, where the node A may allocate and free PBs from its own PB pool. However, peer node B may have read access to the data stored in the PBs of node A's PB Pool. In such a system, the node B may have its own separate pool of PBs that is managed solely by the node B, where the node B may allocate and free PBs from its own PB pool. However, peer node A may have read access to the data stored in the PBs of node B's PB pool.

Figure 3:
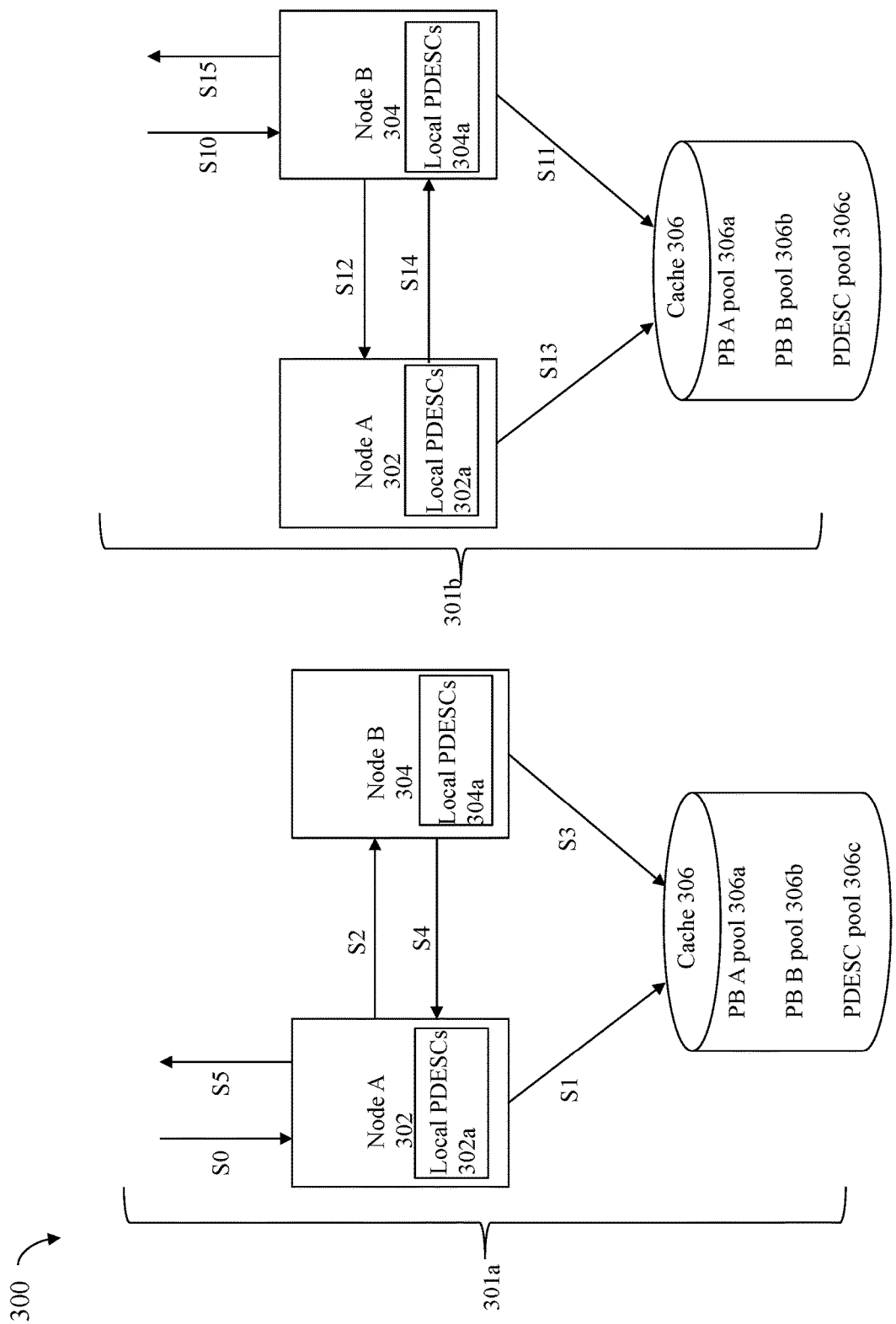
FIG. 3 is an example illustrating processing performed for an existing protocol in a data storage system.

Referring to FIG. 3, shown is an example 300 illustrating a write protocol in one existing system not in accordance with the techniques herein. The example 300 illustrates the dual node architecture including a node A 302, a node B, and a cache 306. For purposes of illustration in discussion below related to FIG. 3, assume the primary node is node A.

The example 300 includes an element 301a denoting the sequence of steps performed in at least one system to process the write I/O operation received by the primary node which for purposes of illustration is the node A. The example 300 includes an element 301b denoting the sequence of steps performed in at least one system to process the write I/O operation received by the non-primary node which for purposes of illustration is the node B.

Referring to the element 301a, at a step S0, the node A 302 receives the write I/O from a host. Following the step S0, a step S1 is performed in which the node A 302 allocates a PB for the write I/O in the cache 306, and stores the write data of the received write I/O in the PB of the cache 306. The cache 306 includes a PB A pool 306a, a PB B pool 306b, and a PDESC pool 306c. The PB A pool 306a denotes the pool of PBs managed exclusively by the node A. In the step S1, the node A allocates the PB for the write I/O from the PB pool A 306a. The PB B pool 306b denotes the pool of PBs managed exclusively by the node B. The PDESC pool 306c denotes the pool of PDESCs managed by the primary node, which in this example is node A. Following the step S1 is a step S2.

In the step S2, the node A 302, as the primary node, allocates a PDESC from the PDESC pool 306c of the cache 306, assigns a new sequence number to the PDESC, and creates a local in-memory copy (302a) of the descriptor information to be stored in the PDESC. The descriptor information includes the new sequence number, the target logical address and a pointer or reference to the allocated PB. The local in-memory copy 302a may be a node-local copy of the PDESCs in the node A's local memory (e.g., RAM or other form of volatile memory) accessible only to the node A 302. In the step S2, the node A 302 sends the descriptor information and the cache address of the PDESC in PDESC pool 306 of the cache 306 to the peer node B 304. Following the step S2 is a step S3.

In the step S3, the peer node B 304 receives the descriptor information and the cache address of the PDESC and persistently stores the descriptor information in the PDESC located at the cache address in the cache 306. In the step S3, the peer node B 304 also stores a node-local copy of the PDESCs 304a in its local memory (e.g., RAM or other form of volatile memory) accessible only to node B 304. Following the step S3 is a step S4.

In the step S4, the peer node B 304 sends a response to the receiving node A 302 indicating that the PDESC is stored persistently in the cache 306. The node A 302 receives the response from the node B 304. Following the step S4 is a step S5. In the step S5, the node A 302 sends a response to the host regarding successful completion of the write I/O operation received in the step S0.

In the element 301a the primary node A 302 receives the write I/O operation. However in a dual node architecture, both the node A 302 and its peer node B may receive write I/Os as well as other commands and operations. Reference is now made to the element 301b illustrating the sequence of processing steps performed in at least one system to process the write I/O operation received by the non-primary node, which for purposes of illustration in this example is the node B.

At a step S10, the non-primary node B receives a write I/O from a host. Following the step S10, a step S11 is performed in which the node B 304 allocates a PB for the write I/O in the cache 306, and stores the write data of the received write I/O in the PB of the cache 306. In the step S11, the node B allocates the PB from the PB B pool. Following the step S11 is a step S12.

In the step S12, the node B 304 issues a request to the primary node A to allocate a PDESC from the PDESC pool 306c of the cache 306 and to also assign a new sequence number to the allocated PDESC. In the step S12, the node B 304 receives the cache address of the PDESC in the PDESC pool 306c and receives the new sequence number. The node B 304 creates a local copy 304a of the descriptor information to be stored in the PDESC. The descriptor information includes the new sequence number, the target logical address and a pointer or reference to the allocated PB. The local copy 304a of the descriptor information or PDESC may be a node-local copy of the PDESCs in the node B's local memory (e.g., RAM or other form of volatile memory) accessible only to the node B 304. In the step S12, the node B 304 sends the descriptor information and the cache address of the PDESC to the peer node A 302. Following the step S12 is a step S13.

In the step S13, the peer node A 302 receives the descriptor information and the cache address of the PDESC and persistently stores the descriptor information in the PDESC located at the cache address in the cache 306. In the step S13, the peer node A 302 also stores a node-local copy (302a) of the PDESC in its local memory (e.g., RAM or other form of volatile memory) accessible only to node A 302. Following the step S13 is a step S14.

In the step S14, the node A 302 sends a response to the node B 304 indicating that the PDESC is stored persistently in the cache 306. The node B 304 receives the response from the node A 302. Following the step S14 is a step S15. In the step S15, the node B 304 sends a response to the host regarding successful completion of the write I/O operation received in the step S10.

The foregoing protocol as illustrated in FIG. 3 introduces significant latency in that the foregoing processing steps are serialized, include a round trip to the peer node, and include two separate trips for writes to the cache (e.g., once for writing the PB by the node receiving the write I/O and a second time for writing the PDESC by the peer node (that did not receive the write I/O)).

Described in the following paragraphs are techniques for a new protocol which preserves the time order of the write operations and other commands or operations that may be cached while also significantly improving the write latency as compared to the protocol as illustrated and described in connection with FIG. 3.

Figure 4:
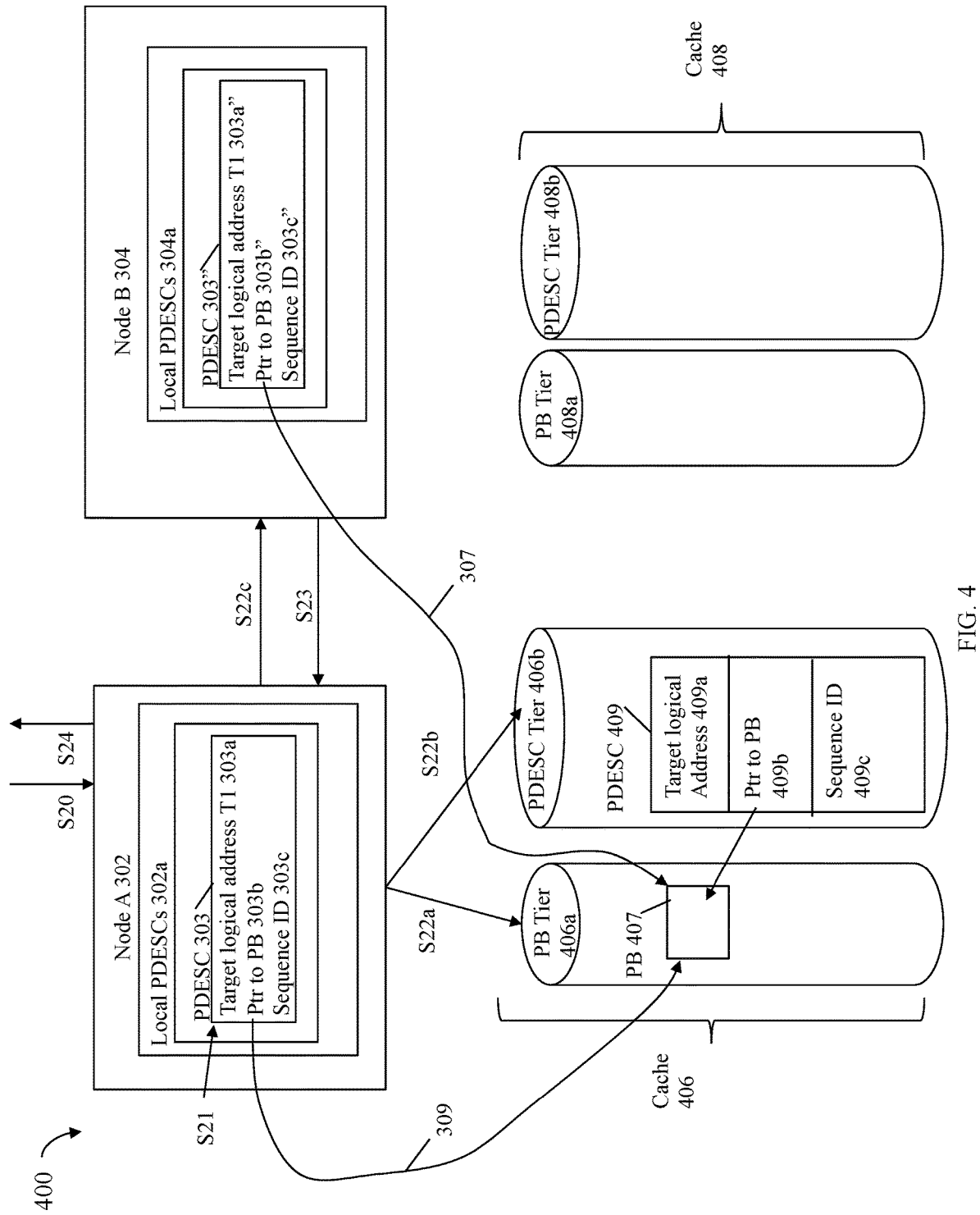
FIGS. 4 and 5 are examples illustrating processing performed for a protocol in at least one embodiment in accordance with the techniques herein.

Referring to FIG. 4, shown is an example 400 illustrating components and processing that may be performed in an embodiment in accordance with the techniques herein for a new protocol in a system with a dual node architecture.

The example 400 includes the node A 302 and the node B 304 as generally described above. The node A may include the node local copy of PDESCs 302a used by the node A 302. The node B 306 may include the node local copy of the PDESCs 304a used by the node B 304. Consistent with other discussion herein, the element 302a may denote the in-memory copy of the PDESCs used by the node A 302, and the element 304a may denote the in-memory copy of the PDESCs used by the node B 304. The PDESCs of 302a, 304a may be used, for example, to service read I/Os received, respectively, by the node A 302 and the node B 304.

The elements 406 and 408 may collectively include information stored in the caching devices or the PDs of the system. The elements 406, 408 collectively form the cache of the dual node system. The element 406 may denote caching tiers managed only by the node A 302, and the element 408 may denote caching tiers managed only by the node B 304. Thus, in the example 400, each of the nodes 302, 304 may maintain and manage its own set of PB and PDESC tiers. In particular, the node 302 has a PB caching tier 406a and a PDESC caching tier 406b, and the node 304 has a PB caching tier 408a and a PDESC caching tier 408b. The caching tiers 406a-b and 408a-b may be implemented as logical extents or partitions of physical storage of the caching PDs of the system. As described above, in at least one embodiment, the caching PDs of the system may be NVRAM devices that are external drives or devices with respect to the nodes 302, 304.

In the example 400, the node A 302 performs processing to manage the PB tier 406a and the PDESC tier 406b. For example, the node A 302 is the only node of the pair that allocates and frees pages, slots or blocks of the PB tier 406a as needed to store new write data for write I/Os received by the node A 302. The node A 302 is the only node of the pair that allocates and frees pages, slots or blocks of the PDESC tier 406b as needed to store descriptors for new write data stored in an associated PB of the PB tier 406a.

In the example 400, the node B 304 performs processing to manage the PB tier 408a and the PDESC tier 408b. For example, the node B 304 is the only node of the pair that allocates and frees pages, slots or blocks of the PB tier 408a as needed to store new write data for writes received by the node B 304. The node B 304 is the only node of the pair that allocates and frees pages, slots or blocks of the PDESC tier 408b as needed to store descriptors for new write data stored in an associated PB of the PB tier 408a.

As discussed above and illustrated in FIG. 4, an embodiment in accordance with the techniques herein provides for each of the nodes 302, 304 managing its own PD tier and PDESC tier of the cache. An embodiment in accordance with the techniques herein illustrated in FIG. 4 may be contrasted with the existing protocol of FIG. 3 in that the existing protocol of FIG. 3 not in accordance with the techniques herein has a single global tier of PDESCs managed solely by the primary node.

In the example 400, there is an active-active configuration where I/Os and commands may be received and serviced by both the node A 302 and the node B 304. For purposes of illustration of the techniques herein, assume a write I/O operation from a host is received by the node A 302 in a step S20. The received write I/O may write data to a target logical address, such as LUN or logical device at an LBA or offset on the LUN. Following the step S20, a step S21 is performed.

The step S21 may include processing performed by the node A 302 that allocates a new PB 407 from the PB tier 406a of the cache 406 managed by the node A, allocates a new PDESC 409 from the PDESC tier 406b of the cache 406 managed by the node A, and constructs a local in-memory copy of the descriptor PDESC 303 for the received write I/O operation. Generally, the PDESC 303 may include the PDESC information for the write I/O operation received in the step S20. The PDESC 303 may include the target logical address 303a for the received write operation, a pointer (ptr) or reference 303b to the PB 407 containing the data written by the received write operation, and a sequence identifier (ID) 303c.

In accordance with the techniques herein, the sequence ID 303c may be assigned in the step S21 locally by the particular node, such as the node A, that received the write I/O operation. Thus, in contrast to one existing protocol such as described in connection with FIG. 3, an embodiment in accordance with the techniques herein as illustrated in FIG. 4 may have each of the nodes A and B both assign sequence IDs to the received write I/O operations. In the embodiment of FIG. 4 in accordance with the techniques herein, there is no single primary node that assigns all sequence IDs. In contrast to the embodiment of FIG. 4 in accordance with the techniques herein, FIG. 3 illustrates a protocol not in accordance with the techniques herein where all sequence IDs are assigned only by a single designated primary node of the node pair. Additionally each node tracks the largest sequence ID it has assigned locally to received requests or operations. Generation of the sequence ID 303c, and more generally, generation of sequence IDs for write operations and other commands by the nodes 302 and 304 in accordance with the techniques herein, is discussed in more detail below.

Following the step S21, a step S22 is performed. The step S22 is described below as including the substeps S22a-c. In at least one embodiment, all the substeps S22a-c may be performed in parallel. The step S22 may include the substep S22a where the node A 302 stores the write data of the received write I/O in the cache 406. In the substep S22a, the node A 302 stores the write data of the received write I/O (e.g., received in the prior step S20) in the allocated PB 407 of the PB tier 406a. The node A 302 handles management and allocation of the PB 407 from the PB tier 406a of its cache 406.

The step S22 may also include the substep S22b where the node A 302 writes the local in-memory descriptor PDESC 303 for the received write I/O operation to the cache 406. In particular, the step S22b includes writing the contents of the local descriptor PDESC 303 to the descriptor PDESC 409 in the cache 406. The node A 302 handles management and allocation of the PDESC 409 from the PDESC tier 406b. As discussed above in connection with the prior step S21, the descriptor information for the PDESC 409 may be stored locally on the node A in the local in-memory PDESC copy 303 included in the local PDESCs 302a of the node A. Subsequent to the step S21, the step S22b is performed where the content of the local node A descriptor, PDESC 303, is then written to the descriptor PDESC 409 in the cache 406.

Consistent with other discussion above with the in-memory local descriptor PDESC 303 of the node A, the corresponding cached descriptor PDESC 409 stored in the PDESC tier 406b in the step S22b may include the target logical address 409a of the write I/O operation received in the step S20, a reference or pointer (ptr) 409b to the associated PB 407 in the PB tier 406a containing the write data of the write operation, and a sequence ID (identifier) 409c. The cached PDESC elements 409a-c correspond respectively to the node A local PDESC elements 303a-c.

The step S22 may also include the substep S22c where the node A 302 sends the descriptor information (i.e., contents) of the PDESC 303 for the write I/O operation received in the step S20 to the peer node B 304. In response, the node B 304a updates its local PDESCs 304a to include the descriptor information of PDESC 303 and, in response, sends S23 an acknowledgement to the node A. In particular, the BDESC 303" denotes the copy of the PDESC 303 stored locally on the node B in the local PDESCs 304a of the node B. Additionally, in response to the node B receiving the PDESC 303 and prior to sending the acknowledgement in the step S23, the node B may perform processing to extract the sequence ID of the PDESC 303 and update its local store of tracked sequence IDs including the largest sequence ID assigned by the node A and the largest sequence ID assigned by the node B. As discussed in more detail elsewhere herein each of the nodes A and B may independently and locally track the largest sequence ID assigned by the node A and the largest sequence ID assigned by the node B. The foregoing largest sequence IDs tracked by a node may be used by the node in generating and assigning new sequence IDs to received write I/O operations based on EQUATION 1 as discussed in subsequent paragraphs.

In at least one embodiment as noted above, the substeps S22a, S22b and S22c of the step S22 may be performed in parallel. Subsequent to commencing the substeps S22a-c in parallel, the node A 302 waits to receive the acknowledgement in the step S23 from the peer node B and also waits for both the substeps S22a (e.g., caching the received write operation data in the PB 407) and S22b (e.g., caching the received write operation's descriptor 303 in the PDESC 409) to complete. Once the node A receives the acknowledgement in the step S23 from the peer node B indicating that the step S22a has successfully completed, determines that the step S22a (e.g., caching the received write operation data in the PB 407) has successfully completed, and determines that the step S22b (e.g., caching the received write operation's descriptor 303 in the PDESC 409) has successfully completed, the node A may return an acknowledgement to the host in the step S24 indicating that the received write operation of the step S20 has successfully completed.

In at least one embodiment where the substeps S22a-c are performed in parallel as noted above, a challenge is how to maintain the required time order of the write operations across the nodes A and B when the write descriptor PDESC 409 is stored in the cache 406 (in the substep S22b) in parallel with notifying the peer node B (in the substep S22c). In an embodiment in accordance with the techniques herein, sequence IDs may be used to establish the required time order dependency for write operations. In the embodiment in accordance with the techniques herein, the time order is achieved by using monotonically increasing sequence IDs assigned locally by both the nodes A and B where the particular node that receives a particular write I/O operation may assign the sequence ID for the particular write I/O operation. In at least one embodiment, the sequence IDs may be integer values such as positive integer values.

For correctness to maintain the required time order of write operations that may be stored in the caches 406, 408, the necessary time order may be achieved using node local sequence ID assignment by taking advantage of a key principle. The key principle may be characterized in that the sequence IDs of all outstanding writes (i.e., not yet acknowledged to the host as complete) collectively across both the nodes A and B have to be greater than the sequence ID of the most recently acknowledged write (i.e., acknowledged to the host as complete) across both the nodes A and B. The order of the sequence IDs of the outstanding writes does not matter for correctness with respect to the required time order of the cached write operations across both the nodes A and B. The foregoing is described in more detail in the following paragraphs.

It should be noted that although write operations in FIG. 4 are used to illustrate the techniques herein, more generally, the techniques herein may be used with any suitable operation, request or command received by the nodes A and B where the received operation, request or command may be cached in the caches 406, 408, and assigned a sequence ID in order to maintain the required time order of the cached items across the nodes A and B. The time order denoted by the monotonically increasing sequence IDs of the cached PDESCs denotes the order requirement in which the cached items (e.g., commands, requests or operation) are applied to the stored data when flushing the cached items from the caches 406, 408.

In the substep S22c above, each node, such as the node A 302, sends the most recent sequence ID of the write request the node is currently ingesting or processing to its peer node, such as the node B. The foregoing most recent sequence ID sent by a node is also the largest sequence ID assigned by the node up to the current point in time. The sequence ID is sent in the substep S22c as part of the PDESC sent from a node, such as the node A 302, to its peer node such as node B. When a node receives a new write, the node may locally assign the new write a new sequence ID (i.e., as stored in the PDESC for the new write) based on the algorithm expressed by the following EQUATION 1:

new sequence ID=MAX (largest assigned sequence ID on the node,largest received sequence ID from the peer node)+increment     EQUATION 1 where

MAX is a maximum function that returns the largest of its 2 arguments.

The "largest assigned sequence ID on the node" denotes the largest sequence ID the node has already assigned to a write operation received by the node.

The "largest received sequence ID from the peer node" denotes the largest sequence ID the node has received from the peer node in the sub step S22c in connection with the peer node processing a write request. Thus the "largest received sequence ID from the peer node" denotes the largest sequence ID the peer node has already assigned to a write operation received by the peer node. The node receiving a PDESC from its peer node in connection with the peer node performing the substep S22c may extract the sequence ID from the PDESC for use in tracking the largest sequence ID of its peer node.

In an embodiment with two nodes as described herein, the "increment" is either 1 or 2 so that sequence IDs generated locally by the node A (or more generally a first of the two nodes A and B) are always even, and sequence IDs generated locally by the peer node B (or more generally the remaining second of the two nodes A and B) are always odd. In such an embodiment, a first of the two nodes is assigned the even numbered sequence IDs and a second of the two nodes is assigned the odd numbered sequence IDs denoting that the first node always generates only even numbered sequence IDs and the second node always generates odd numbered sequence IDs. In this manner, a node generating a new sequence ID based on EQUATION 1 adds either 1 or 2 to ensure that the new sequence ID is even (if the node is assigning the even numbered sequence IDs) or odd (if the node is assigned the odd numbered sequence IDs).

In an embodiment in accordance with the techniques herein, each of the nodes A and B may track the largest sequence ID received from its peer node in connection with PDESCs received from the peer node when performing the substep S21c to service write operations received at the peer node.

The node A 302 and the node B 304 maintain, respectively, local PDESCs 302a, 304a containing a local in-memory copy of PDESCs stored in the caches 406, 408. The local PDESCs 302a, 304a may be used respectively by the node A 302 and the node B 304 when servicing read I/O operations received. For example, assume that processing described above in connection with the write I/O received in the step S20 by the node A has completed. Also assume that T1 denotes the target logical address written to by the write I/O from the step S20. Subsequent to completing the processing described in connection with the FIG. 4 above for the write I/O received in the step S20, a read I/O is received from the host at the node B 304 to read the data from target logical address T1. The node B 304 services the read and obtains the data stored at T1 using the PDESC 303" stored in the local PDESCs 304a. In particular, the node B 304 locates the PDESC 303" in 304a for the logical address T1 and then uses the pointer or reference field 303b" to access the associated PB 407 containing the data stored at T1, read the cached copy of the data stored at T1 from the PB 407, and return the data read from the PB 407 to the host in response to read I/O. The arrow 307 denotes the fact that the ptr field 303b" of the PDESC 303" of the node B points to or references the PB 407. In a similar manner, the arrow 309 denotes the fact that the ptr field 303b of the PDESC 303 of the node A 302 points to or references the PB 407.

Subsequent to processing the read I/O received by the node B, assume further now a second read I/O operation is received at the node A to read the data stored at the logical address T1. The node A 302 services the read and obtains the data stored at T1 using the PDESC 303 stored in the local PDESCs 302*a*. In particular, the node A 302 locates the PDESC 303 in 302*a* for the logical address T1 and then uses the pointer or reference field 303*b* to access the associated PB 407 containing the data stored at T1, read the cached copy of the data stored at T1 from the PB 407, and return the data read from the PB 407 to the host in response to second read I/O.

At a point in time after processing the write I/O and the two read I/O operations discussed above, assume that some of the cached data from the caches 406, 408 is flushed to BE PD storage locations on non-volatile BE PDs (not illustrated in FIG. 4) accessible to both the nodes A and B. Consistent with other discussion herein, the flushing is performed in accordance with the increasing sequence IDs of the PDESCs stored on the PDESC tiers 406*b*, 408*b* to maintain the required time order. In particular, the flushing may flush cached data (e.g., such as data stored in PBs of the PB tiers 406*a*, 408*a*) from the caches 406, 408 in any suitable manner to apply writes and other commands or operations in the order denoted by the increasing sequence IDs of the PDESCs stored on the PDESC tiers 406*b*, 408*b*. For example, when flushing the PDESC 409 from the PDESC tier 406*b*, the data stored in the PB 407*s* is accessed using the ptr field 409*b*, and the data is then stored in a BE PD location, PD1. Once the PDESC 409 has been processed and the data of the associated PB 407 flushed from the cache 406 to the BE storage location PD1, the PDESC 409 and PB 407 may be available for reuse by the node A. Additionally, once the PDESC 409 has been processed and the data of the associated PB 407 flushed from the cache 406 to the BE storage location PD1, the local PDESC copies 303 and 303" corresponding to the PDESC 409 are updated to reference the BE storage location PD1 rather than the PB 407. In particular, the PDESC 303 of the node A may have the field 303*b* updated to point to or reference the BE storage location PD1; and the PDESC 303" of the node B may have the field 303*b"* updated to point to or reference the BE storage location PD1. In this manner, the node A may use the updated PDESC 303 to service subsequent read requests for the logical address T1 by reading the data from the BE storage location PD1 (as denoted by the updated field 303*b*), and the node B may use the updated PDESC 303" to service read requests for the logical address T1 by reading the data from the BE storage location PD1 (as denoted by the updated field 303*b"*).

The example 400 of FIG. 4 illustrates processing performed in connection with a write operation received by the node A. More generally, the processing may be performed in connection with other requests, operations or commands which are cached. Additionally, processing as described in FIG. 4 with respect to the node A receiving a write operation may be similarly performed by the node B in response to the node B receiving a write operation. Generally, the processing of FIG. 4 may be performed by the node receiving the write operation or other request, operation or command that is cached.

Figure 5:
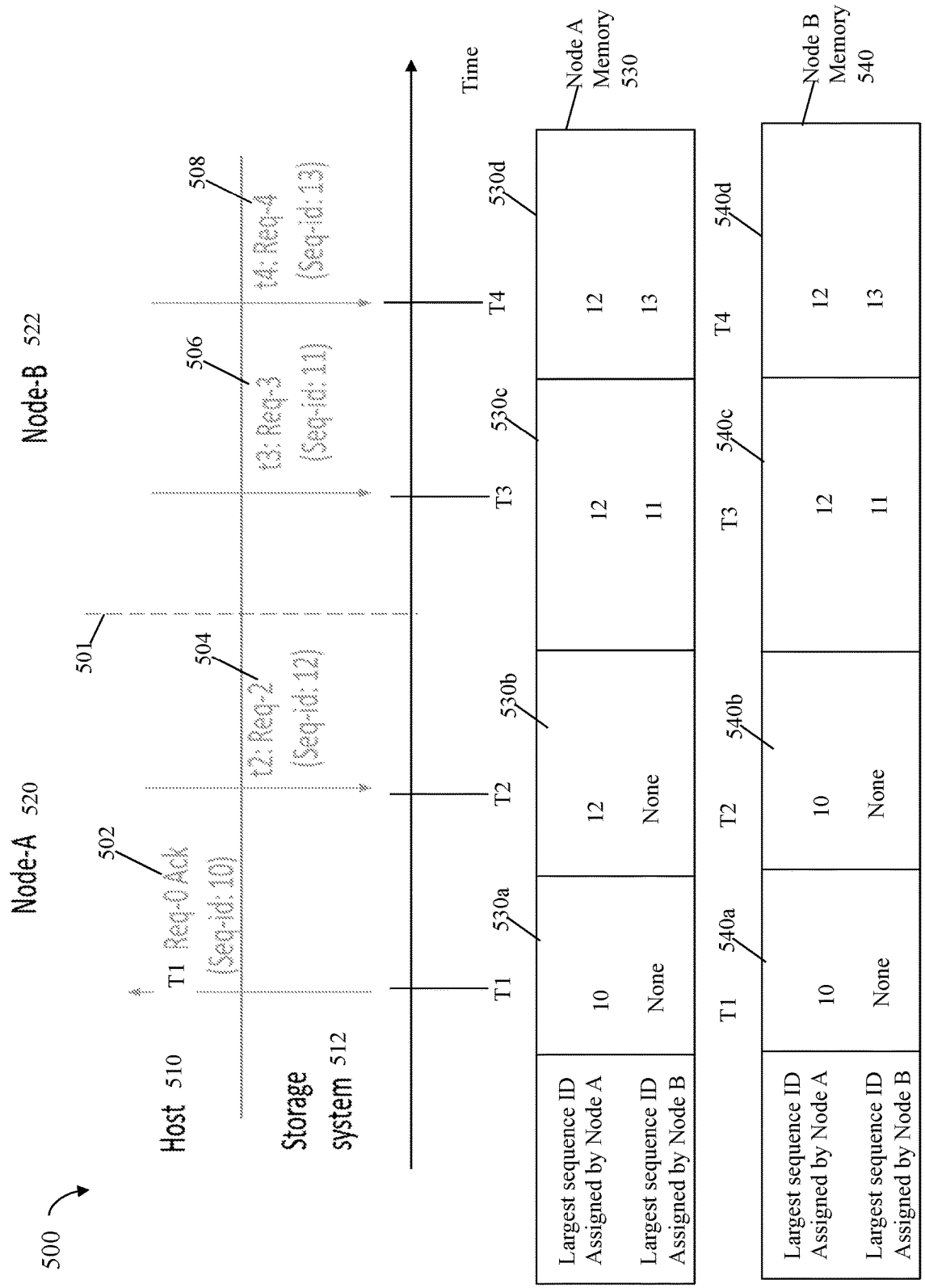

Referring to FIG. 5, shown is an example 500 illustrating use of the techniques herein in more detail. The example 500 illustrates messages and requests exchanged between a host 510 and a data storage system 512 over a period time. Consistent with other examples herein, the data storage system 512 may be a dual node system including the node A 520 and the node B 522. The left hand side of the dashed line 501 denotes the messages and requests exchanged between the host 510 and the node A 520 of the data storage system 512. The right hand side of the dashed line 501 denotes the messages and requests exchanged between the host 510 and the node B 522 of the data storage system 512.

Described below in connection with the example 500 is an illustration of the nodes A and B locally assigning sequence IDs to received requests, such as write requests, using the algorithm described above and expressed in EQUATION 1. In the example 500, assume that the node A only generates the even numbered sequence IDs and the node B only generates the odd numbered sequence IDs. The element 530 may denote contents stored locally in the memory of the node A for the largest sequence IDs assigned locally by the node A and also by its peer node B. In particular, the element 530*a* denotes the largest sequence IDs tracked for node A and node B from node A's point of view at the time T1; the element 530*b* denotes the largest sequence IDs tracked for node A and node B from node A's point of view at the time T2; the element 530*c* denotes the largest sequence IDs tracked for node A and node B from node A's point of view at the time T3; and the element 530*d* denotes the largest sequence IDs tracked for node A and node B from node A's point of view at the time T4.

The element 540 may denote contents stored locally in the memory of the node B for the largest sequence IDs assigned locally by the node B and also by its peer node A. In particular, the element 540*a* denotes the largest sequence IDs tracked for node A and node B from node B's point of view at the time T1; the element 540*b* denotes the largest sequence IDs tracked for node A and node B from node B's point of view at the time T2; the element 540*c* denotes the largest sequence IDs tracked for node A and node B from node B's point of view at the time T3; and the element 540*d* denotes the largest sequence IDs tracked for node A and node B from node B's point of view at the time T4.

Prior to the time T1, the host 510 sent a write request 0 (req-0) to the node A 520 and the node A assigned the request 0 a sequence ID of 10. At the time T1, the node A sends an acknowledgement 502 to the host 510 regarding completion of the write I/O request 0. As denoted by the element 502, the write I/O request 0 that is acknowledged at the time T1 has an assigned sequence ID of 10. At the time T1, assume that node B has not received any write requests and has not assigned any sequence IDs. At the time T1 as denoted by the element 530*a*, the node A locally tracks that 10 is the largest and most recently assigned sequence ID assigned by the node A. When previously processing the request 0, the node A communicated to the node B (e.g., in the substep S22*c*) that the request 0 is assigned sequence ID=10 which the node B also tracks in its local memory copy as denoted by the element 540*a*. At the time T1, the node B locally tracks that 10 is the largest sequence ID assigned by its peer node A.

At a point in time T2 subsequent to T1, the host 510 sends a write request 2 (req-2) to the node A 520. As denoted by the element 504, the node A 520 locally assigns a sequence ID to the request 2 based on EQUATION 1 above whereby the node A assigns the sequence ID of 12 to the request 2. Based on EQUATION 1, the sequence ID of request 2=MAX(10, null)+2=12. Accordingly the node A updates its local copy of tracked sequence IDs in its memory as denoted by the element 530*b* where the largest sequence ID assigned locally by the node A is updated from 10 to 12.

In connection with the request 2 received by the node A at the time T2, the node A communicates to the node B (e.g., in the substep S22*c*) a PDESC for request 2, where the PDESC for the request 2 includes the assigned sequence ID=12. However, at a time T3 before the node B receives and processes the PDESC for request 2 including the updated largest assigned sequence ID=12 from the node A, the node B 522 receives a write request 3 (req-3) from the host 510. The node B locally assigns a sequence ID to the request 3 based on EQUATION 1 above but using its node B local copy of the most recently tracked sequence IDs as indicated by the element 540*b*. At this point in time T3, the node B has not had a chance to update its local in memory copy of the largest sequence ID assigned by the node A from 10 to 12 so the element 540*b* indicates the largest tracked sequence IDs from the node B's point of view used at the time T3 to assign the sequence ID to the request 3. Based on EQUATION 1 and the tracked sequence IDs of the element 540*b*, the sequence ID of request 3=MAX(10, null)+1=11 (e.g., as denoted by the element 506). Accordingly the node B updates its local copy of tracked sequence IDs for the node B from none to 11 in its memory as denoted by the element 540*c*. Also when processing the request 3, the node B sends (e.g., in the substep S22*c*) to the node A the PDESC for the request 3, where the PDESC for request 3 includes the assigned sequence ID=11. Accordingly the node A processes the PDESC for request 3, extracts the sequence ID=11, and updates its local memory copy of the tracked largest sequence IDs for the node B from none to 11 as denoted by the element 530*c*.

After assigning the sequence ID to the request 3 at the time T3, the node B processes the PDESC for the request 2 received from the node A as part of the substep S22*c* processing for request 2. Processing performed by the node B for the received PDESC of the request 2 includes extracting the sequence ID=12 from the PDESC and (as denoted by the element 540*c*) updating the node B's local memory copy of the largest sequence IDs assigned by the node A from 10 to the updated value of 12.

At a point in time T4 subsequent to T3, the node B 522 receives a write request 4 (req 4) from the host 510. As denoted by the element 508, the node B 522 locally assigns a sequence ID to the request 4 based on EQUATION 1 above and the tracked largest sequence IDs of 540*c*. In this case, the node B assigns the sequence ID of 13 to the request 4. Based on EQUATION 1, the sequence ID of request 4=MAX(12, 11)+1=13. Accordingly the node B updates its local copy of tracked sequence IDs for the node B from 11 to 13 in its memory as denoted by the element 540*d*. Also when processing the request 4, the node B communicates (e.g., in the substep S22*c*) to the node A the PDESC for the request 4, where the PDESC for the request 4 includes the assigned sequence ID=13. The node A receives the PDESC for request 4, extracts the sequence ID=13, and updates its local memory copy of the tracked largest sequence IDs for the node B from 11 to 13 as denoted by the element 540*c*.

As illustrated by the example 500, the requests 2, 3 and 4 are received by the data storage system, respectively, at the times T2, T3 and T4. In particular, the request 3 is received at the time T3 after the request 2 is received at the time T2. However, the later received request 3 is assigned a smaller sequence ID of 11 than the sequence ID of 12 that is assigned to the earlier received request 2. The foregoing is consistent with EQUATION 1 in accordance with the techniques herein since the requests 2, 3 and 4 each have a unique sequence ID that is greater than the sequence ID of 10 assigned to the most recently acknowledged request of both nodes, which is request 0. The relative order of the sequence IDs assigned to the outstanding requests 2, 3 and 4 does not matter for the purposes of ensuring the proper time order of the requests across the nodes so long as all such sequence IDs of the outstanding requests are unique and larger than the sequence ID of the most recently acknowledged request 0. In one aspect, the relative order of sequence IDs assigned to the outstanding requests 2, 3 and 4 does not matter since it is the relative order of the sequence IDs of the acknowledged completed requests which is significant for the required time order. In at least one embodiment, there is no guarantee regarding an order in which the outstanding requests will be completed or applied to the BE stored data.

It should be noted that the foregoing examples of the techniques herein are illustrated with a dual node system. More generally, the techniques herein may be used with a system having two or more nodes where each of the two or more nodes locally assigns sequence IDs for requests received by the node. Thus generally the techniques herein may be used in a system with N nodes where N is an integer that is 2 or more. In this case, a first of the N nodes receiving a request may be characterized as having N−1 peer nodes rather than a single peer node as in the dual node system. In such an embodiment, the substep S22*c* and the step S23 discussed above in connection with FIG. 4 is performed with respect to all peer nodes. For example, in at least one embodiment, the substep S22*c* includes sending in parallel the PDESC to all the peer nodes and waiting for the acknowledgements (S23) from all peer nodes before the first node returns an acknowledgement to the host regarding completion of the received request (that triggered the substep S22*c*). Additionally in such an embodiment in which there are N nodes, the increment of EQUATION 1 may generally be a value between 1 and N, inclusively. The For example, assume sequence IDs assigned form a sequence of monotonically increasing integer values that are greater than zero. Each of the nodes may assign sequence IDs for some unique subsequence of the sequence. For example, assume there are 4 nodes. Each of the 4 nodes may locally assign sequence IDs to new requests the node receives as follows:

Node 1 locally assigns sequence IDs from the subsequence (1, 5, 9, 13, 17, . . . )

Node 2 locally assigns sequence IDs from the subsequence (2, 6, 10, 14, 18, . . . )

Node 3 locally assigns sequence IDs from the subsequence (3, 7, 11, 15, 19, . . . )

Node 4 locally assigns sequence IDs from the subsequence (4, 8, 12, 16, 20, . . . )

More formally, each node may be associated with a unique integer K in the inclusive range from 1 to N and the node may assign sequence IDs in the subsequence (K, K+N, K+2N, K+3N, . . . ). In this manner each node assigns sequence IDs only from its associated subsequence and a suitable increment is determined so that the node generates a sequence ID that is monotonically increasing and also included in the particular subsequence uniquely associated with the node. The sequence as well as each of the subsequences may be characterized as monotonically increasing.

As discussed elsewhere herein, the techniques herein may be used in connection with a protocol for processing requests such as write requests or operations where such requests or operations are stored in the cache and then later flushed to the BE PDs. More generally, the protocol may be used in connection with any suitable request or operation that may be cached or logged in the cache and then subsequently processed further such as in connection with flushing the cache. For example, a create snapshot command may be issued in connection with creating a snapshot of a storage object such as a LUN. Snapshots are known in the art and may be characterized as a logical point in time copy of the storage object or LUN. In at least one embodiment, a create snapshot command received by any of the nodes of the system may also be logged or cached by creating a record or descriptor (e.g., a PDESC) for the create snapshot command in the cache. The sequence ID assigned to the create snapshot command may be stored in the PDESC of the cache, where the PDESC includes the descriptor for the create snapshot command. In such a system in accordance with the techniques herein, the create snapshot command may be processed using the new protocol as described herein such as in connection with FIGS. 4, 5, 6A, 6B and 7. Rather than the request being a write request or operation, the request is a create snapshot command that is assigned a sequence ID locally by the node that receives the create snapshot command. In such an embodiment, the create snapshot command may be implemented when the cached record of the command is flushed from the cache. The sequence IDs of cached write operations and the sequence ID of the cached create snapshot command may be used to denote the time order in which the operations or commands are applied with respect to the stored data. For example, assume for a LUN X, the data storage system: receives and acknowledges a first write to the LUN X, LBA 0 where the first write is the assigned sequence ID 10; receives and acknowledges a create snapshot command that creates a snapshot of the LUN X where the create snapshot command is assigned the sequence ID 11; and receives and acknowledges a second write to the LUN X, LBA 100 where the second write is assigned the sequence ID 12. Based on the following sequence IDs that may be locally assigned by nodes during processing of the received requests (e.g., the 2 writes and the create snapshot command) in accordance with the techniques herein, the snapshot created by the create snapshot command includes the first write but not the second write. Thus, the techniques herein may generally be used in connection with any suitable cached command or request assigned a sequence ID.

What will now be described in are flowcharts of processing steps of FIGS. 6A, 6B and 7 that may be performed in an embodiment in accordance with the techniques herein. The flowcharts summarize processing described above. Also the FIGS. 6A, 6B and 7 describes processing performed in a dual node system for a write operation. However, as noted elsewhere herein, the processing may more generally be performed in a system with two or more nodes and for other requests, operations or commands besides write operations.

Figure 6A:
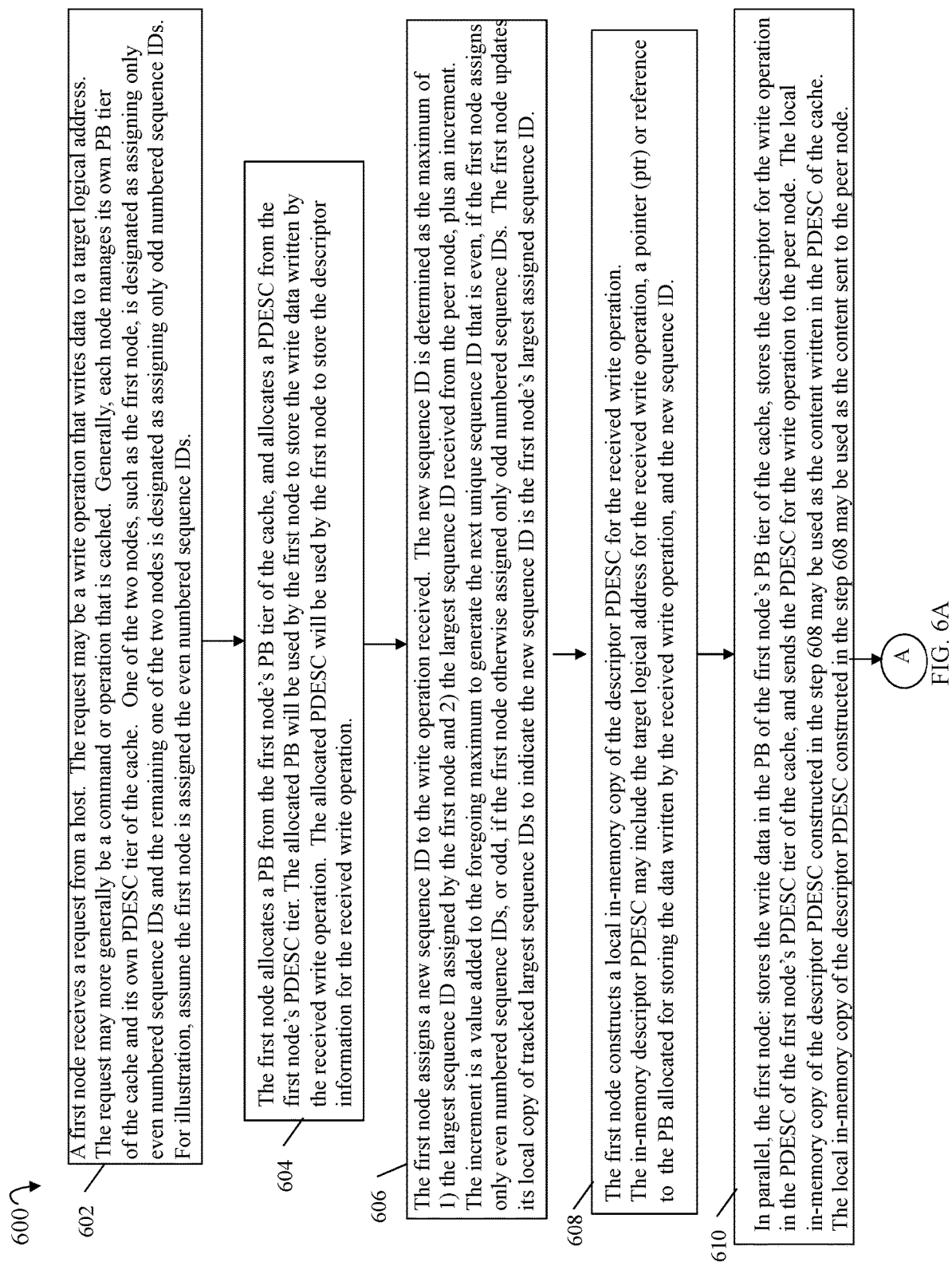
FIGS. 6A, 6B and 7 are flowcharts of processing steps that may be performed in an at least one embodiment in accordance with the techniques herein.
Figure 6B:
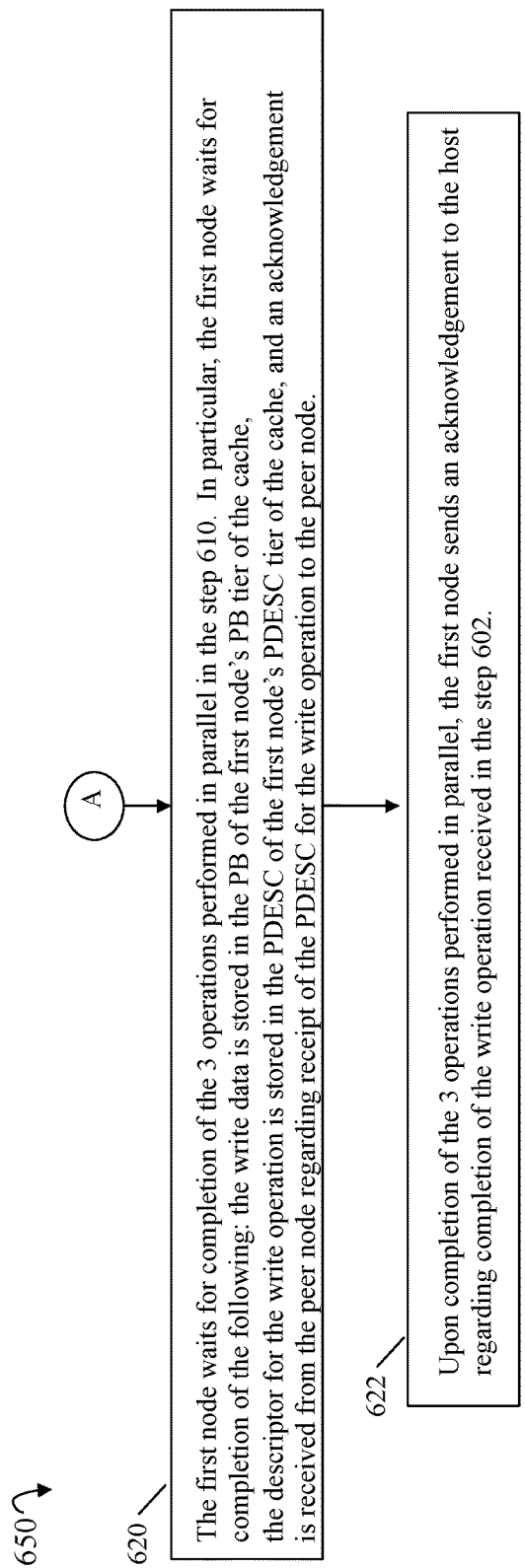

Referring to FIGS. 6A and 6B, shown are flowcharts 600, 650 of processing steps that may be performed in an embodiment in accordance with the techniques herein. The processing steps of the FIGS. 6A and 6B may be performed by a first node that receives a write operation from a host.

At a step 602, a first node receives a request from a host. The request may be a write operation that writes data to a target logical address. The request may more generally be a command or operation that is cached. Generally, each node manages its own PB tier of the cache and its own PDESC tier of the cache. One of the two nodes, such as the first node, is designated as assigning only even numbered sequence IDs and the remaining one of the two nodes is designated as assigning only odd numbered sequence IDs. For illustration, assume the first node is assigned the even numbered sequence IDs. From the step 602, control proceeds to a step 604.

At the step 604, the first node allocates a PB from the first node's PB tier of the cache, and allocates a PDESC from the first node's PDESC tier. The allocated PB will be used by the first node to subsequently store the write data written by the received write operation. The allocated PDESC will be used by the first node to subsequently store the descriptor information for the received write operation. From the step 604, control proceeds to a step 606.

At the step 606, the first node assigns a new sequence ID to the write operation received. The new sequence ID is determined as the maximum of 1) the largest sequence ID assigned by the first node and 2) the largest sequence ID received from the peer node, plus an increment. The increment is a value added to the foregoing maximum to generate the next unique sequence ID that is even, if the first node assigns only even numbered sequence IDs, or odd, if the first node otherwise assigned only odd numbered sequence IDs. The first node updates its local copy of tracked largest sequence IDs to indicate the new sequence ID is the first node's largest assigned sequence ID. From the step 606, control proceeds to a step 608.

At the step 608, the first node constructs a local in-memory copy of the descriptor PDESC for the received write operation. The in-memory descriptor PDESC may include the target logical address for the received write operation, a pointer (ptr) or reference to the PB allocated for storing the data written by the received write operation, and the new sequence ID. From the step 608, control proceeds to a step 610.

At the step 610, in parallel, the first node performs processing that: stores the write data in the PB of the first node's PB tier of the cache, stores the descriptor for the write operation in the PDESC of the first node's PDESC tier of the cache, and sends the PDESC for the write operation to the peer node. The local in-memory copy of the descriptor PDESC constructed in the step 608 may be used as the content written in the PDESC of the cache. The local in-memory copy of the descriptor PDESC constructed in the step 608 may be used as the content sent to the peer node. From the step 610, control proceeds to a step 620.

At the step 620, the first node waits for completion of the 3 operations performed in parallel in the step 610. In particular, the first node waits for completion of the following: the write data is stored in the PB of the first node's PB tier of the cache, the descriptor for the write operation is stored in the PDESC of the first node's PDESC tier of the cache, and an acknowledgement is received from the peer node regarding receipt of the PDESC for the write operation to the peer node. From the step 620, control proceeds to a step 622.

At the step 622, upon completion of the 3 operations performed in parallel in the step 610, the first node sends an acknowledgement to the host regarding completion of the write operation received in the step 602.

Figure 7:
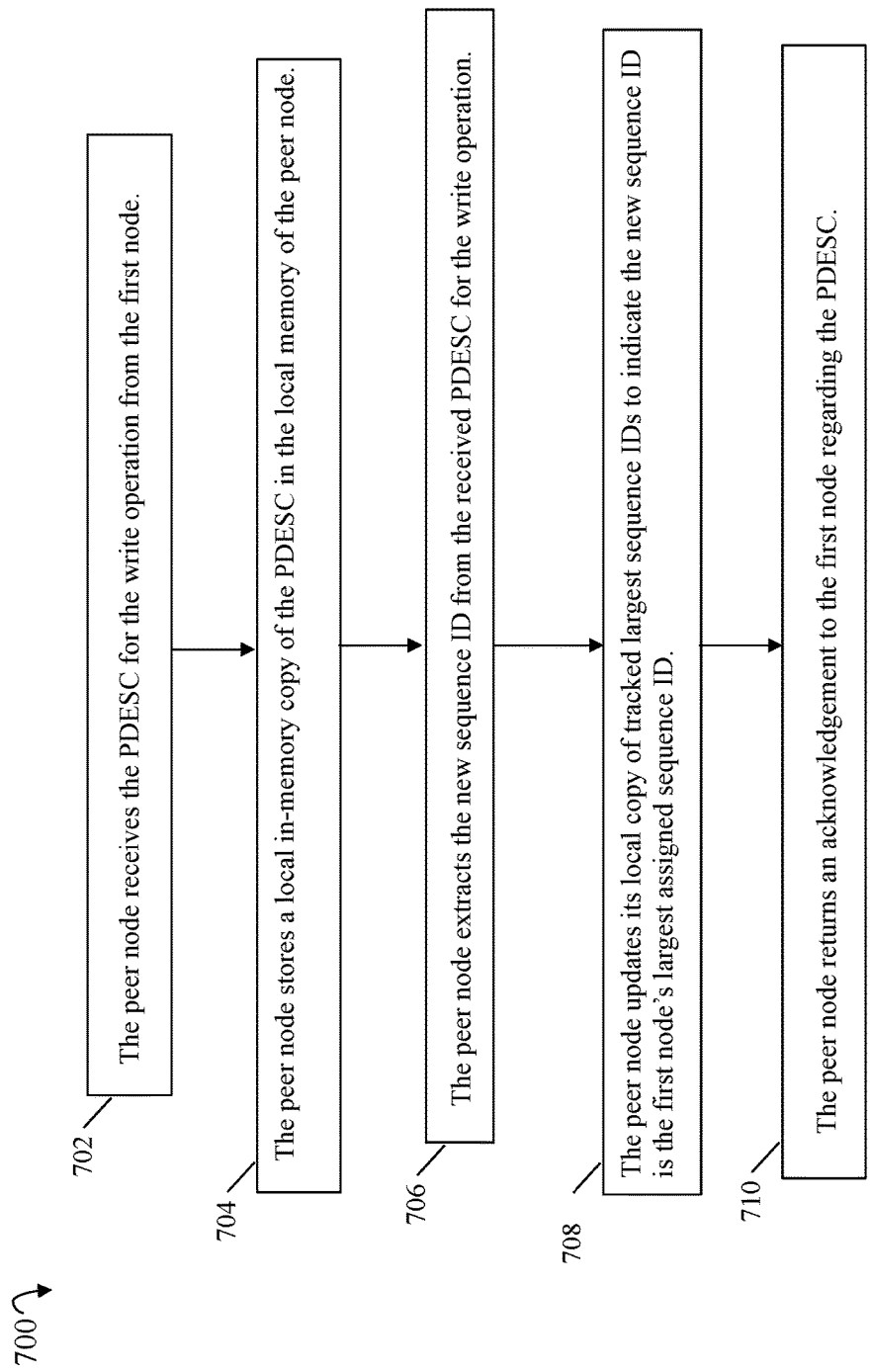

Referring to FIG. 7, shown is another flowchart 700 of processing steps that may be performed in an embodiment in accordance with the techniques herein. The flowchart 700 processing steps may be performed by the peer node that receives the PDESC for the write operation received and processed by the first node. The flowchart 700 processing may be performed by the peer node in response to receiving the PDESC sent from the first node in the step 610 of FIG. 6A.

At a step 702, the peer node receives the PDESC for the write operation from the first node. The PDESC may be sent by the first node, for example, in connection with the step 610 of the FIG. 6A From the step 702, control proceeds to a step 704.

At the step 704, the peer node stores a local in-memory copy of the PDESC in the local memory of the peer node. From the step 704, control proceeds to a step 706.

At the step 706, the peer node extracts the new sequence ID from the received PDESC for the write operation. From the step 706, control proceeds to a step 708.

At the step 708, the peer node updates its local copy of the tracked largest sequence IDs to indicate the new sequence ID is the first node's largest assigned sequence ID. From the step 708, control proceeds to the step 710.

At the step 710, the peer node returns an acknowledgement to the first node regarding the PDESC. In the step 620 of FIG. 6B, the first node is waiting for the acknowledgement that is returned in the step 710.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing requests comprising:
    receiving a first write request from a host at a first node of a data storage system, wherein the first write request writes first data to a first target location, wherein the data storage system includes the first node and a second node; and
    performing first processing to service the first write request, the first processing including:
        assigning, by the first node, a first sequence identifier (ID) to the first write request, wherein the first sequence ID is included in a first subsequence of a sequence of sequence IDs, wherein the first node is the only node of the data storage system that assigns sequence IDs of the first subsequence;
        performing in parallel a first operation that stores the first data in a first page block (PB) of a cache, a second operation that stores a first descriptor for the first write request in a first page descriptor (PDESC) of the cache, and a third operation that sends the first descriptor to the second node, wherein the first descriptor includes the first sequence ID;
        determining by the first node that the first operation, the second operation and the third operation have successfully completed; and
        responsive to determining by the first node that the first operation, the second operation and the third operation have successfully completed, sending an acknowledgement from the first node to the host indicating successful completion of the first write request.

2. The method of claim 1, wherein assigning, by the first node, the first sequence ID further comprises:
    determining a first value that is a maximum of a second value and a third value stored locally on the first node, wherein the second value is a largest sequence ID assigned to a request received by the first node and the third value is a largest sequence ID received from the second node and denotes a largest sequence ID assigned to a request received by the second node, wherein the third value is received by the first node as part of processing performed by the second node for servicing a second write request received by the second node; and
    determining a first increment to add to the first value, wherein the first increment is an amount added to the second value to obtain the first sequence ID that is a next sequence ID in the first subsequence.

3. The method of claim 2, wherein the sequence is monotonically increasing and wherein the first subsequence is monotonically increasing.

4. The method of claim 2, wherein the first descriptor includes a reference or pointer to the first PB in the cache and wherein the first descriptor includes the first target location written to by the first write request.

5. The method of claim 4, wherein the second node receives the first descriptor sent by the first node and, in response to receiving the first descriptor, the second node performs second processing comprising:
    updating a local copy of tracked sequence IDs to include the first sequence ID of the first descriptor as a fourth value that is the largest sequence ID that is received from the first node and that denotes the largest sequence ID assigned to a request received by the first node, wherein the local copy is used only by the second node, wherein the local copy also includes a fifth value denoting the largest sequence ID assigned to a request received by the second node; and
    returning an acknowledgement to the first node indicating receipt of the first descriptor by the second node.

6. The method of claim 5, wherein the second processing includes storing the first descriptor in a first location in a memory local to the second node, and wherein the second node uses the first descriptor to service a read request received by the second node, wherein the read request reads data stored at the first target location.

7. The method of claim 6, wherein servicing the read request by the second node includes:
    using the reference or pointer to the first PB to read the first data stored in the first PB of the cache; and
    returning the first data to a requester that sent the read operation to the second node.

8. The method of claim 5, wherein the cache includes a first PB tier, a first PDESC tier, a second PB tier, and a second PDESC tier, wherein the first PDESC tier is managed solely by the first node, the first PB tier is managed solely by the first node, the second PB tier is managed solely by the second node, and the second PDESC tier is managed solely by the second node.

9. The method of claim 8, wherein the first PB is allocated by the first node from the first PB tier and the first PDESC is allocated by the first node from the first PDESC tier.

10. The method of claim 9, wherein the second node receives from the host the second write request that writes second data to a second target location, and wherein the second node performs third processing for servicing the second write request, the third processing including:
    allocating a second PB from the second PB tier;
    allocating a second PDESC from the second PDESC tier;
    assigning a second sequence ID to the second write request, wherein the second sequence ID is included in a second subsequence of the sequence of sequence IDs, wherein the second node is the only node of the data storage system that assigns sequence IDs of the second subsequence;
    performing in parallel a fourth operation that stores the second data in a second PB, a fifth operation that stores a second descriptor for the second write request in a the second PDESC, and a sixth operation that sends the second descriptor to the first node, wherein the second descriptor includes the second sequence ID, a pointer or reference to the second PB, and the second target location;

determining by the second node that the fourth operation, the fifth operation and the sixth operation have successfully completed; and responsive to determining by the second node that the fourth operation, the fifth operation and the sixth operation have successfully completed, sending an acknowledgement from the second node to the host indicating successful completion of the second write request.

11. The method of claim 10, wherein assigning, by the second node, the second sequence ID further comprises:

determining a sixth value that is a maximum of the fourth value and the fifth value included in the local copy of tracked sequence IDs used only by the second node; and determining a second increment to add to the sixth value, wherein the second increment is an amount added to the sixth value to obtain the second sequence ID that is a next sequence ID in the second subsequence.

12. The method of claim 11, wherein the second subsequence is monotonically increasing.

13. A system comprising:

at least one processor; and one or more memories comprising code stored therein that, when executed, performs a method of processing requests comprising:

receiving a first write request from a host at a first node of a data storage system, wherein the first write request writes first data to a first target location, wherein the data storage system includes the first node and a second node; and performing first processing to service the first write request, the first processing including:

assigning, by the first node, a first sequence identifier (ID) to the first write request, wherein the first sequence ID is included in a first subsequence of a sequence of sequence IDs, wherein the first node is the only node of the data storage system that assigns sequence IDs of the first subsequence;

performing in parallel a first operation that stores the first data in a first page block (PB) of a cache, a second operation that stores a first descriptor for the first write request in a first page descriptor (PDESC) of the cache, and a third operation that sends the first descriptor to the second node, wherein the first descriptor includes the first sequence ID;

determining by the first node that the first operation, the second operation and the third operation have successfully completed; and responsive to determining by the first node that the first operation, the second operation and the third operation have successfully completed, sending an acknowledgement from the first node to the host indicating successful completion of the first write request.

14. A non-transitory computer readable medium comprising code stored thereon that, when executed, performs a method of processing requests comprising:

receiving a first write request from a host at a first node of a data storage system, wherein the first write request writes first data to a first target location, wherein the data storage system includes the first node and a second node; and performing first processing to service the first write request, the first processing including:

assigning, by the first node, a first sequence identifier (ID) to the first write request, wherein the first sequence ID is included in a first subsequence of a sequence of sequence IDs, wherein the first node is the only node of the data storage system that assigns sequence IDs of the first subsequence;

performing in parallel a first operation that stores the first data in a first page block (PB) of a cache, a second operation that stores a first descriptor for the first write request in a first page descriptor (PDESC) of the cache, and a third operation that sends the first descriptor to the second node, wherein the first descriptor includes the first sequence ID;

determining by the first node that the first operation, the second operation and the third operation have successfully completed; and responsive to determining by the first node that the first operation, the second operation and the third operation have successfully completed, sending an acknowledgement from the first node to the host indicating successful completion of the first write request.

15. The non-transitory computer readable medium of claim 14, wherein assigning, by the first node, the first sequence ID further comprises:

determining a first value that is a maximum of a second value and a third value stored locally on the first node, wherein the second value is a largest sequence ID assigned to a request received by the first node and the third value is a largest sequence ID received from the second node and denotes a largest sequence ID assigned to a request received by the second node, wherein the third value is received by the first node as part of processing performed by the second node for servicing a second write request received by the second node; and determining a first increment to add to the first value, wherein the first increment is an amount added to the second value to obtain the first sequence ID that is a next sequence ID in the first subsequence.

16. The non-transitory computer readable medium of claim 15, wherein the sequence is monotonically increasing and wherein the first subsequence is monotonically increasing.

17. The non-transitory computer readable medium of claim 15, wherein the first descriptor includes a reference or pointer to the first PB in the cache and wherein the first descriptor includes the first target location written to by the first write request.

18. The non-transitory computer readable medium of claim 17, wherein the second node receives the first descriptor sent by the first node and, in response to receiving the first descriptor, the second node performs second processing comprising:

updating a local copy of tracked sequence IDs to include the first sequence ID of the first descriptor as a fourth value that is the largest sequence ID that is received from the first node and that denotes the largest sequence ID assigned to a request received by the first node, wherein the local copy is used only by the second node, wherein the local copy also includes a fifth value denoting the largest sequence ID assigned to a request received by the second node; and returning an acknowledgement to the first node indicating receipt of the first descriptor by the second node.

19. The non-transitory computer readable medium of claim 18, wherein the second processing includes storing the first descriptor in a first location in a memory local to the second node, and wherein the second node uses the first descriptor to service a read request received by the second node, wherein the read request reads data stored at the first target location.

20. The non-transitory computer readable medium of claim 19, wherein servicing the read request by the second node includes:

using the reference or pointer to the first PB to read the first data stored in the first PB of the cache; and returning the first data to a requester that sent the read operation to the second node.

\* \* \* \* \*